United States Patent

Ebringer et al.

[11] Patent Number: 6,094,464
[45] Date of Patent: Jul. 25, 2000

[54] BURST MODE RECEIVER

[75] Inventors: Lawrence Ebringer, San Francisco; Scott C. Petler, Sebastopol, both of Calif.

[73] Assignee: Next Level Communications, Rohnert Park, Calif.

[21] Appl. No.: 08/728,949

[22] Filed: Oct. 11, 1996

Related U.S. Application Data

[60] Provisional application No. 60/005,444, Oct. 12, 1995.

[51] Int. Cl.[7] ................................................. H04L 27/233
[52] U.S. Cl. ........................ 375/342; 375/350; 375/364; 375/368
[58] Field of Search .................................. 375/229, 231, 375/232, 234, 324, 326, 328, 340, 342, 343, 344, 362, 364, 368, 350

[56] References Cited

U.S. PATENT DOCUMENTS

| | | | |
|---|---|---|---|
| 4,847,876 | 7/1989 | Baumbach et al. | 375/113 |
| 5,012,491 | 4/1991 | Iwasaki | 375/96 |
| 5,170,415 | 12/1992 | Yoshida et al. | 375/326 |
| 5,214,674 | 5/1993 | Sayegh | 375/97 |
| 5,297,172 | 3/1994 | Shenoy et al. | 375/371 |
| 5,311,546 | 5/1994 | Paik et al. | 375/232 |
| 5,440,265 | 8/1995 | Cochran et al. | 329/300 |
| 5,479,451 | 12/1995 | Eldering et al. | 375/343 |
| 5,590,160 | 12/1996 | Ostman | 375/367 |
| 5,710,792 | 1/1998 | Fukawa et al. | 375/229 |

OTHER PUBLICATIONS

J.W.M. Bergmans et. al. "A Class of Data–Aided Timing–Recovery Schemes," *IEEE Trans. Comm.* vol. 43, No. 2/3/4, Feb./Mar./Apr. 1995, pp. 1819–1827.

C.A. Eldering et. al., Digital Burst Mode Clock Recovery Technique for Fiber Optic Systems, *IEEE Journal of Lightwave Tech.*, vol. 12, No. 2, Feb. 1994, pp. 271–279.

R. Mehlan et. al, "A Fully Digital Feedforward MSK Demodulator . . . ", *IEEE Trans. Comm.* vol. 42, No. 4, Nov. 1993, pp. 434–443.

M.P. Fitz and W.C. Lindsey, "Decision–Directed Burst–Mode Carrier Synchronization Techniques," *IEEE Trans. on Comm.*, vol. 40, No. 10, Oct. 1992, pp. 1644–1653.

F. Ling, "On Training Fractionally Spaced Equalizers Using Intersymbol Interpolation", *IEEE Trans. on Comm.*, vol. 37, No. 10, Oct. 1989, pp. 1096–1099.

G. Ungerboeck "Fractional Tap–Spacing Equalizer and Consequences for Clock Recovery in Data Modems," *IEEE Trans. on Comm.*, vol. COM–24, No. 8, Aug. 1976.

*Primary Examiner*—Amanda T. Le
*Attorney, Agent, or Firm*—J.P. Blasko Professional Corp.; Charles A. Eldering; John P. Blasko

[57] ABSTRACT

In a burst mode communication system bursts arrive at a receiver which must correctly acquire and track carrier and clock phases in order to recover the transmitted symbols. A burst mode receiver is used to recover the clock and carrier phase. The detection of an initiator pulse indicates the presence of a burst signal, and a cross-coupled fractionally spaced digital filter structure is used with a known preamble to perform symbol sampling phase recovery and carrier phase acquisition, and during the normal mode of operation results in a tracking of the symbol and carrier phases.

24 Claims, 10 Drawing Sheets

TABLE I
I AND Q VALUES IN PREAMBLE

| I | Q |
|---|---|
| 1 | 1 |
| 0 | 0 |
| 0 | 0 |
| 1 | -1 |
| 1 | 1 |
| 1 | -1 |
| 1 | 1 |
| 1 | -1 |
| -1 | -1 |
| -1 | 1 |
| 1 | 1 |
| 1 | -1 |
| -1 | -1 |
| 1 | -1 |
| -1 | -1 |
| 1 | -1 |

*FIG. 9*

TABLE II
DETECTOR ROTATION

| $b_I$ | $b_Q$ | DEGREE ROTATION |
|---|---|---|
| + | + | 0 |
| − | + | 90 |
| − | − | 180 |
| + | − | 270 |

FIG. 10

TABLE III
I/Q TRANSFORMATIONS

| $b_I$ | $b_Q$ | ROTATION |
|---|---|---|
| +<br>0<br>+<br>0 | +<br>+<br>0<br>0 | I+ TO I<br>Q+ TO Q<br>(NO CHANGE OR 0° ROTATION) |
| −<br>− | 0<br>+ | Q+ TO I<br>I− TO Q<br>(90° CLOCKWISE ROTATION) |
| +<br>0 | −<br>− | Q− TO I<br>I+ TO Q<br>−90° (90° COUNTERCLOCKWISE ROTATION) |
| − | − | I− TO I<br>Q− TO Q<br>180° ROTATION |

FIG. 11

BURST MODE RECEIVER

CROSS-REFERENCES

This application claims the benefit of U.S. Provisional Application Ser. No. 60/005,444 filed on Oct. 12, 1995, entitled "Preamble for Burst Mode Reception," of which Lawrence Ebringer is the inventor, with attorney docket number NP2008.

This application is also related to application Ser. No. 08/728,947 filed on even date herewith, entitled "Burst Mode Preamble," of which Lawrence Ebringer is the inventor, now abandoned, which describes a preamble whose characteristics are well suited for burst mode communications, and application Ser. No. 08/794,791 filed on even date herewith, entitled "Synchronization and downconversion in TDM/TDMA systems," of which, Grant E. Moulton, Eric J. Rossin are the inventors, now pending, which describes a method of synchronization and digital downconversion for a Time Division Multiplex/Time Division Multiple Access Fiber-to-the-Curb system.

All of the aforementioned applications are incorporated herein by this reference, but are not admitted to be prior art.

BACKGROUND

There are many communications systems in which multiple transmitters send signals to one receiver which must correctly recover the information from each transmitter. A common method to allow the receiver to recognize each signal is to have transmitters take turns such that each transmitter transmits a burst of information, with the transmissions scheduled such that only one signal is received at the receiver in each opportunity or time slot. This method is commonly referred to as Time Division Multiple Access or TDMA.

The TDMA technique, while allowing multiple transmitters to send signals to a single receiver, has the drawback that the receiver generally needs to receive a certain amount of information from a transmitter in order to synchronize properly. This is particularly a problem for transmitters operating on radio frequencies, where the information is modulated onto a carrier frequency, and the receiver must determine the correct carrier frequency, carrier phase, symbol clock frequency and symbol clock phase in order to correctly recover the symbols transmitted, and thus the information contained within the burst.

One solution to this problem is to transmit a preamble in the burst which allows the receiver time to determine all of the necessary parameters to allow recovery of all of the information which will follow the preamble. The preamble may be a predetermined sequence or random data, but in either case cannot contain useful information since its purpose is to train the receiver, and the output of the receiver during this training period may or may not be correct. The problem with this solution is that a long preamble will allow the receiver to train properly, but uses tine which could be instead be dedicated to the transmission of useful information.

This is particularly a problem when the bursts of information are short, since the preamble can actually be bigger than the amount of useful information, leading to a transmission efficiency of less than 50%. The solution of creating longer bursts of information has a severe drawback in that the times between bursts will necessarily become longer resulting in delays in transmission. Using long bursts could result in the average waiting period incurred by a transmitter having useful information to transmit increasing to the point where the delay affects the quality of service.

In the transmission of voice signals delay can affect echoes and make them annoyingly noticeable to the speaker, or in extreme cases the delay can be so long that the speaker and listener notice the excessive delay and can never be sure of which party is speaking. In the transmission of data signals delay can affect scheduling of resources in the network.

For all of the aforementioned reasons, it is important to have a burst mode receiver which can train quickly and which does not need a large preamble with respect to the data field.

SUMMARY OF THE INVENTION

In a burst mode communications system where bursts containing a predetermined preamble and data are transmitted on a carrier frequency and received at a burst mode receiver, a method and apparatus for recovery of the symbols and subsequently the data is presented, based on thus use of the predetermined preamble to establish the correct symbol sampling phase and minimize carrier phase offset in the recovered signal.

Recovery of the burst mode signal is accomplished by converting a received analog signal to a digital signal and downconverting the digital signal to a baseband signal having an I channel and a Q channel with at least two samples per symbol. The presence of a burst is determined by examining the squared values of received samples of a predetermined symbol and determining, through the use of a threshold, if a burst is present, and if so, which of the samples is nearest to the center of a predetermined symbol in the preamble.

The signals in the I and Q channels are passed through digital filters which have taps which can be adjusted to minimize an error signal which is produced by a subsequent decision circuit. The decision circuit performs thresholding of the filtered samples and makes determinations of the symbol values and correlates the recovered symbols with a stored version of the predetermined preamble during training mode, or with the samples prior to thresholding during normal operation mode. The correlation produces an error signal which during the training mode represents the initial error while the filters are being adjusted to obtain the proper symbol sampling phase and minimize the carrier phase offset, and which during normal mode of operation represents the drift in the symbol sampling and carrier phases. Minimizing this error signal during the training phase results in symbol sampling phase recovery and carrier phase acquisition, and during the normal mode of operation results in a tracking of the symbol and carrier phases.

Traditional approaches to burst mode reception of signals modulated onto carriers include the use of separate symbol sampling phase and carrier phase acquisition circuits which make independent determinations of each quantity and adjust several variable frequency oscillators to obtain the appropriate symbol sampling and carrier phases.

The present invention allows elimination of the variable frequency oscillators and can accomplish sampling phase and carrier phase acquisition in a single filter structure. The present invention allows for optimal implementation of burst mode receivers in that they will require a minimal amount of circuitry in hardware based receivers, or a minimal amount of program code in software or firmware based receivers.

Another advantage of the present invention is that the burst mode receiver architecture and method are tolerant to offsets in frequency and do not require a synchronization system in which all of the carrier and clock signals are phase locked. This allows use of less expensive oscillators at both the burst mode transmitter and receiver.

BRIEF DESCRIPTION OF THE DRAWINGS

FIG. 9 illustrates a table representing the symbol values in the preamble.

FIG. 10 illustrates a method of rotation based on the received $b_I$ and $b_Q$ samples.

FIG. 11 illustrates a method of I/Q rotation based on the received $b_I$ and $b_Q$ samples.

DESCRIPTION OF THE PREFERRED EMBODIMENT OR EMBODIMENTS

Outline

I. INTRODUCTION
II. BURST MODE COMMUNICATIONS IN A FTTC SYSTEM
III. BURST MODE RECEIVER ARCHITECTURE
IV. BURST MODE SIGNAL RECOVERY

I. Introduction

Figure 1:
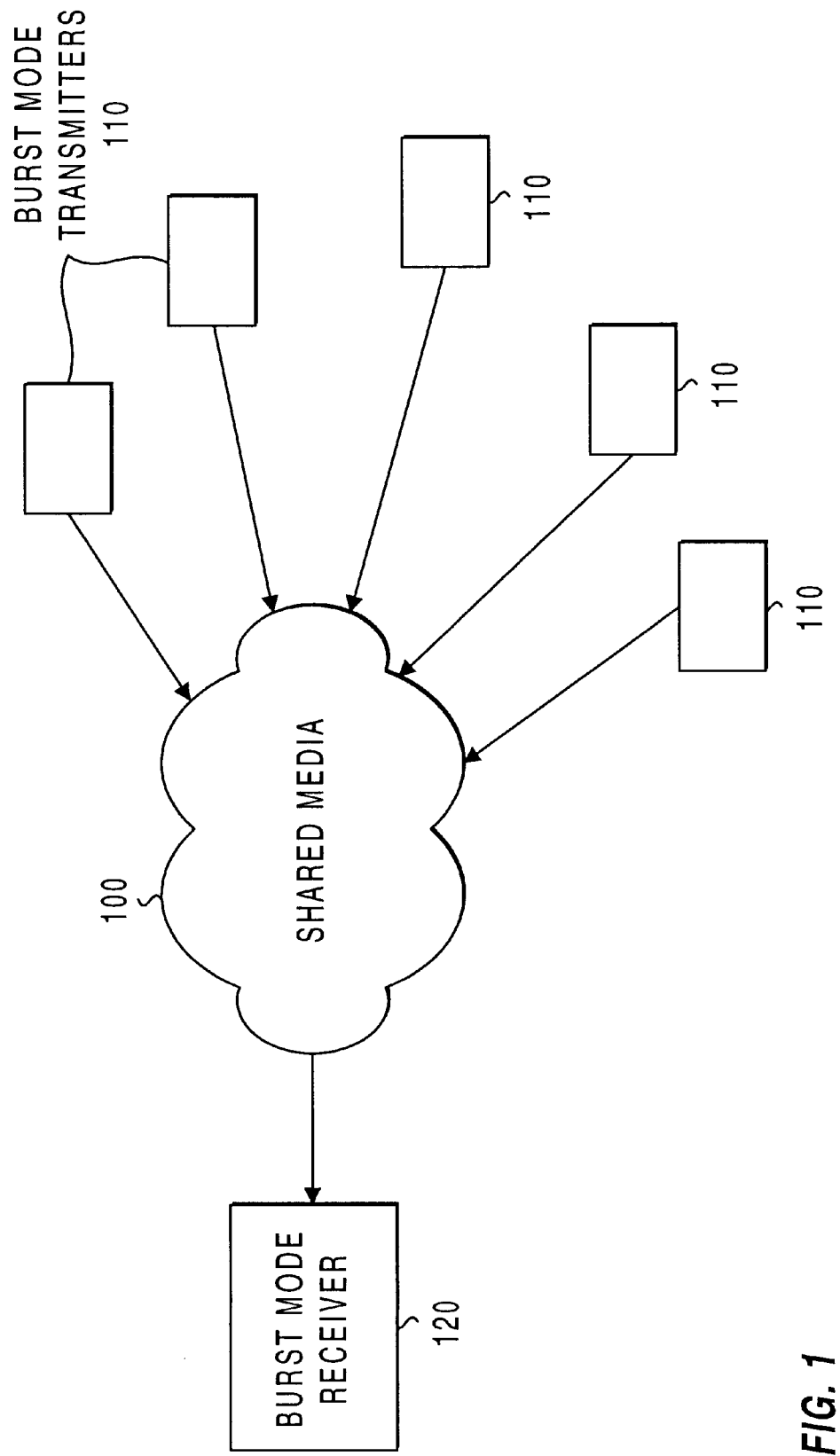
FIG. 1 represents a shared media with multiple burst mode transmitters and a single burst mode receiver.

The general form of a burst mode communications system is illustrated in FIG. 1, and is formed when multiple burst mode transmitters 110 transmit signals over a shared media 100 which are received by a burst mode receiver 120. The shared media can be of a multitude of forms including free space, twisted pair copper cable in a bus configuration, a passive optical network, or a shared coaxial cable network comprised of coaxial cable and splitters. Examples of applications using shared media include local area networks, cellular phone systems, and bi-directional cable TV systems.

Figure 2:
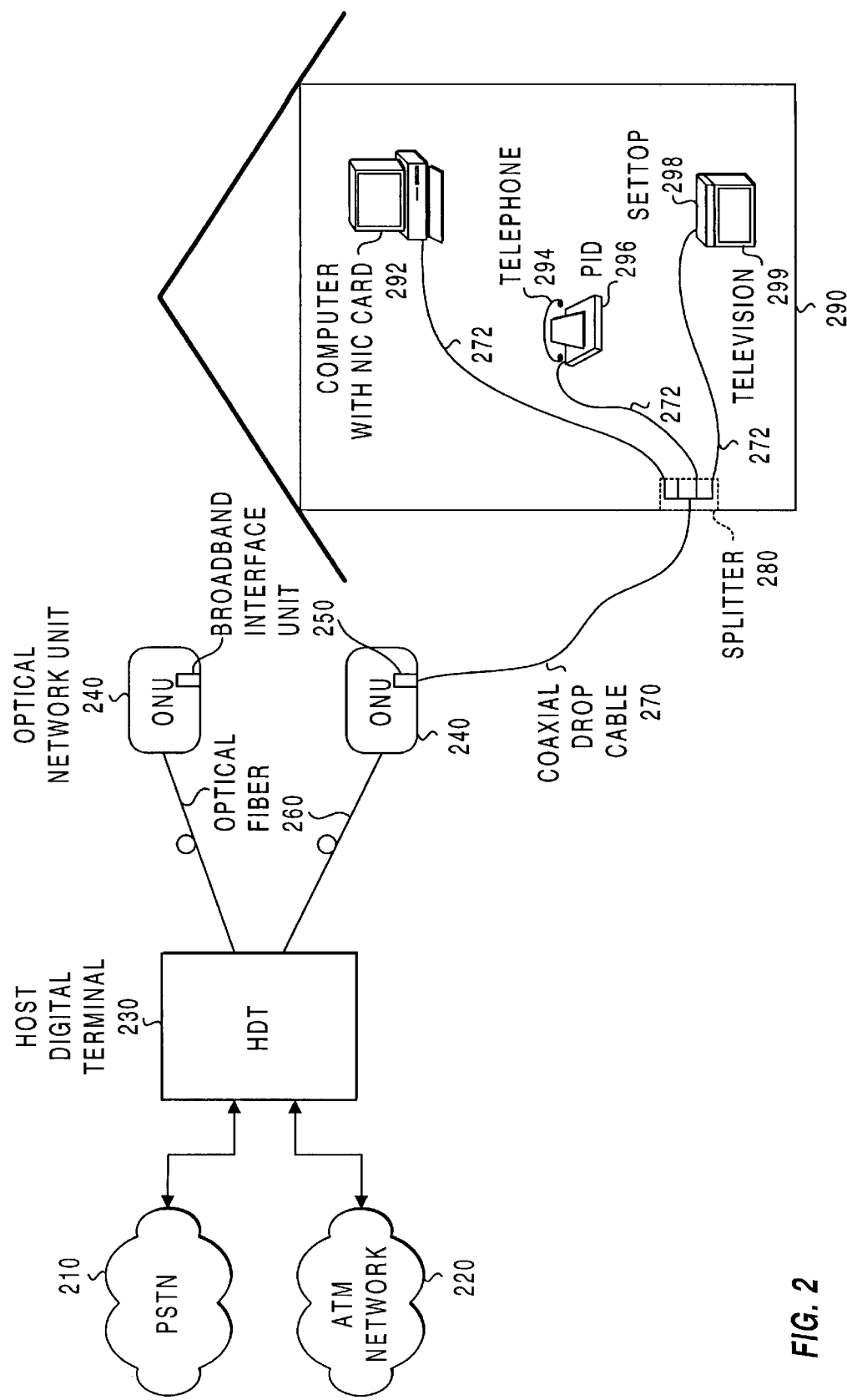
FIG. 2 illustrates a Fiber-to-the-Curb (FTTC) network with a coaxial drop cables to the residence which provides connectivity to a number of devices in the residence and over the shared media formed by the coaxial drop cable, splitter, and in-home coaxial wiring.

FIG. 2 illustrates a Fiber to the Curb (FTTC) network with a subscriber coaxial cable network which forms a shared media. In the FTTC network illustrated, a Host Digital Terminal (HDT) 230 is connected to the Public Switched Telecommunications Network (PSTN) 210 as well as an Asynchronous Transfer Mode (ATM) network 220, and to one or more Optical Network Units (ONUs) 240 via optical fiber 260. A Broadband Interface Unit (BIU) 250 in ONU 240 contains transmit and receive circuits for sending and receiving signals to and from devices in a residence 290.

The devices in the residence 290 are connected to BIU 250 via a subscriber coaxial cable network, which when used herein, is defined as a network comprised of a coaxial drop cable 270, splitter 280, and in-home coaxial wiring 272 which connects an individual residence 290 to the BIU 250. Use of the term subscriber indicates that the customer in the residence is a subscriber or potential subscriber to the services provided over the FTTC telecommunications network. The subscriber coaxial cable network forms a shared media since it allows all devices connected to it to access the BIU 250 with no active switching.

Figure 3:
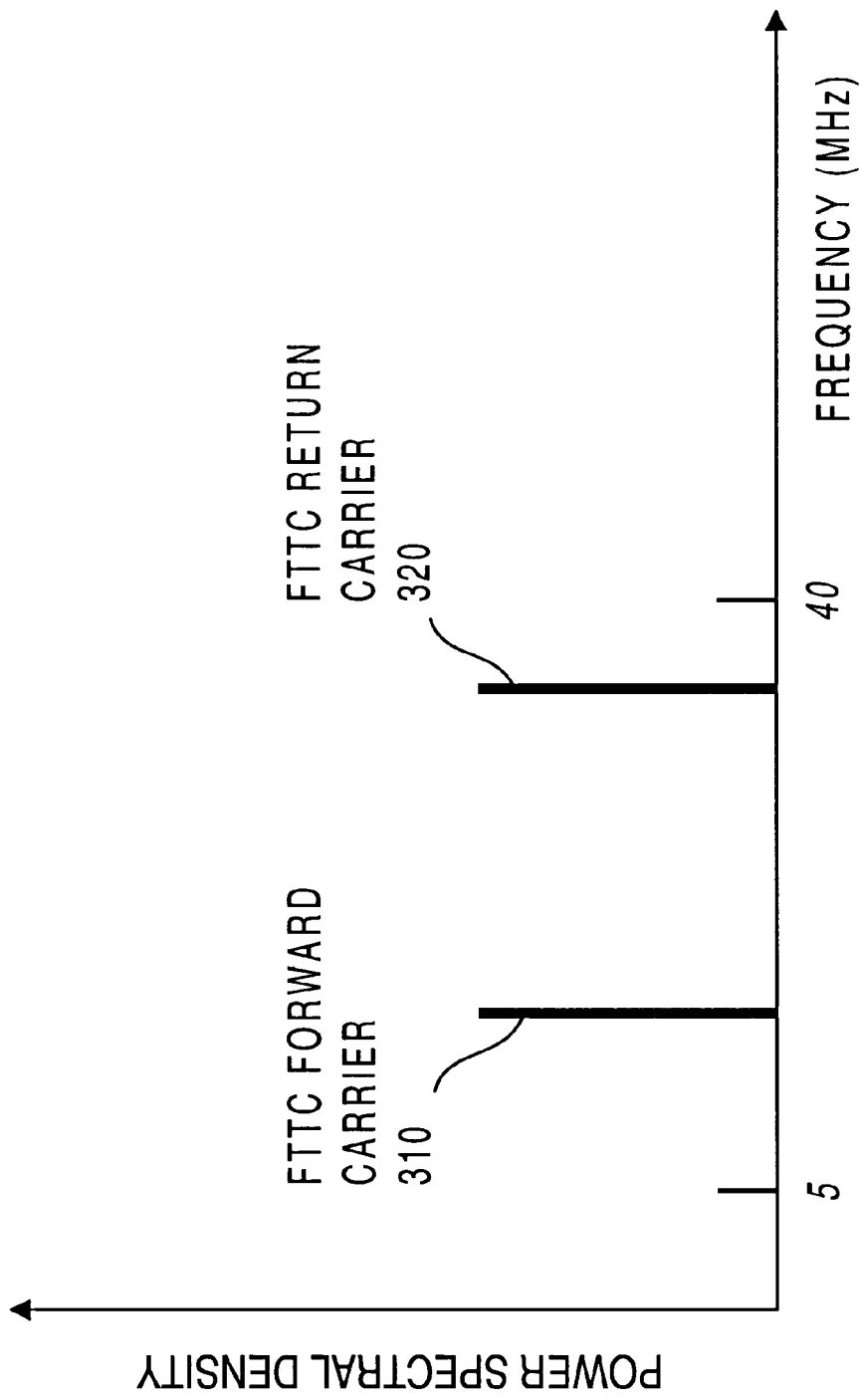
FIG. 3 illustrates a spectrum of forward and return signals on the coaxial drop in a FTTC network.

As shown in FIG. 3, examples of the types of devices which can be present in the residence 290 include a telephone 294 connected to a Premise Interface Device (PID) 296, a computer containing a Network Interface Card 292 and a television 299 with a settop 298. The computer containing a NIC card 292, PID 296, and settop 298 can, via the in-home coaxial wiring 272, splitter 280, and coaxial drop cable 270, all transmit signals to the BIU 250.

II. Burst mode communications in a FTTC system

In the FTTC system digital signals are used to carry voice, video, and data signals to the devices. Asynchronous Transfer Mode (ATM) protocols and formats can be used to carry the signals. The system requires bidirectional communications between the devices in the residence 290 and the ONU 240, and information is transmitted in the return direction, for example, from the devices to the ONU 240 for changing channels on the television 299, carrying out voice conversations on the telephone 294, or using network services on the computer with NIC card 292. The system provides for the transport of ATM cells in the return direction as well as the forward (ONU to devices) direction.

The shared media formed by the subscriber coaxial network suggests that the devices use a multiple access protocol to transmit to the BIU 250 in the ONU 240. A number of multiple access protocols can be used including Frequency Division Multiple Access (FDMA), Code Division Multiple Access (CDMA) and Time Division Multiple Access (TDMA). When a TDMA protocol is used the devices will be assigned opportunities for the transmissions to the BIU 250, and, when ATM protocols are used, will transmit one or more cells in the opportunities. The TDMA protocol requires the receiver in the BIU 250 to be of the burst mode type, which can receive the bursts transmitted by the devices in residence 290.

Although signals can be transmitted on the subscriber coaxial cable network in baseband form when the splitter 280 has the appropriate low frequency characteristics, it is generally more appropriate to transmit signals in both the forward and return direction on passband signals which are centered about some non-zero frequency.

FIG. 3 illustrates a possible spectrum of forward and return signals on a subscriber coaxial network, with a FTTC forward carrier 310, and a FTTC return carrier 320. In one embodiment of an FTTC system, the forward transmission takes place on a FTTC forward carrier 310 at a frequency of 19.44 MHz, with a data rate of 51.84 Mb/s using 16 Quadrature Amplitude Modulation (16 QAM). Transmissions in the return direction can take place on a FTTC return carrier 320 at a frequency of 38.88 MHz, with a data rate of 19.44 Mb/s using Quadrature Phase Shift Keying (QPSK). An advantage of this embodiment is that the spectrum of TV signals above 50 MHz is not disturbed by these transmissions, if such an analog signal is present on the subscriber coaxial network. However, this embodiment is given as an example only, and various frequencies, data rates and modulation formats could be used to practice the invention. It should also be noted that techniques which are commonly referred to as Carrierless Amplitude/Phase (CAP) modulation are subsequent to generation of the signal, equivalent to QPSK and QAM modulation formats.

III. Burst mode receiver architecture

Figure 4:
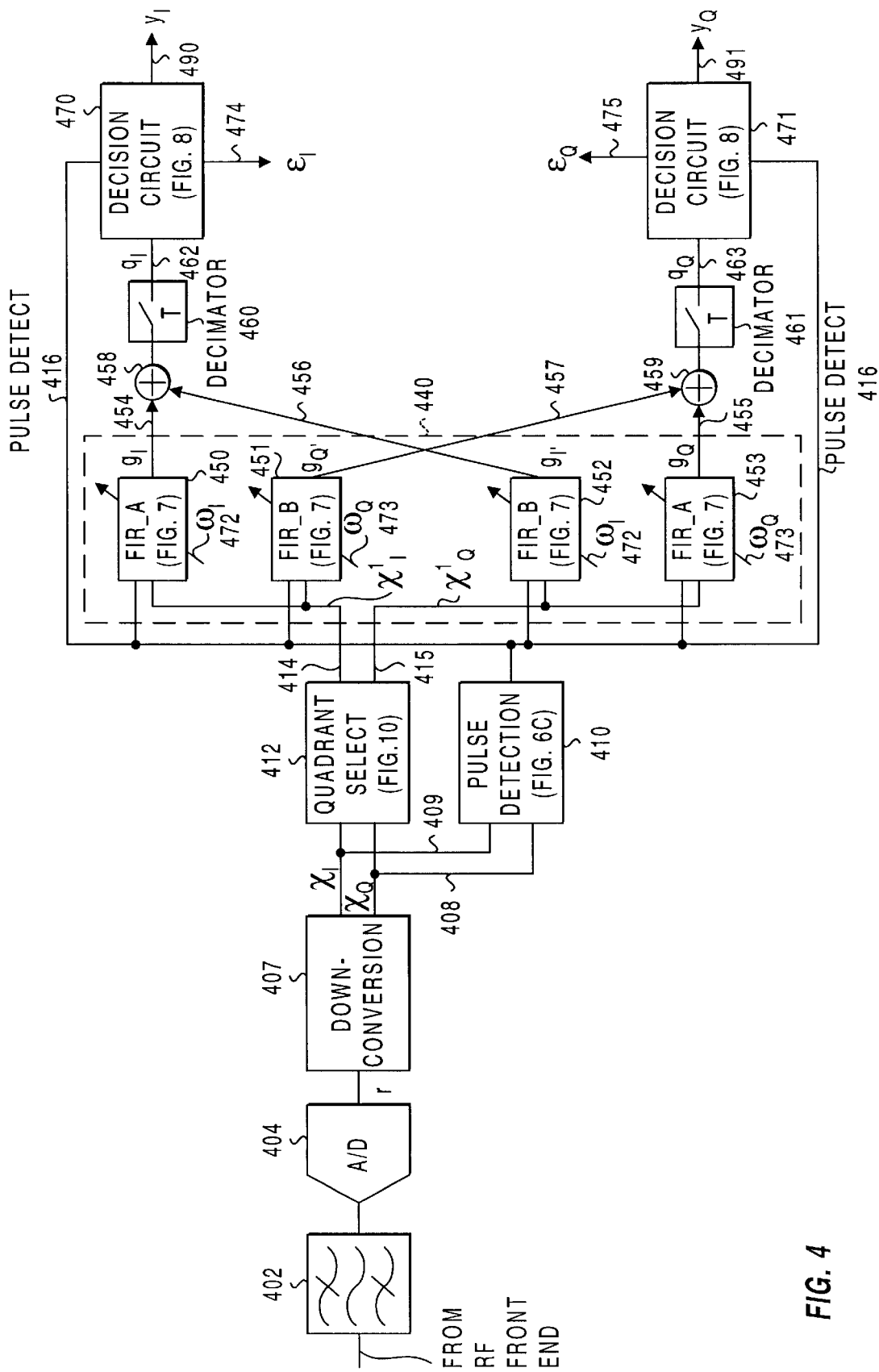
FIG. 4 is a block diagram of one of the embodiments of the burst mode receiver.

A burst mode receiver architecture is illustrated in FIG. 4. For an FTTC network, the receiver would be located in the BIU 250 and connected to the coaxial drop cable 270. In the architecture illustrated in FIG. 4, bursts arrive from an radio frequency (RF) front end and are filtered by a bandpass filter 402. The continuous time signal is converted to a discrete time signal by analog to digital converter 404. In a preferred embodiment the bursts are at a center (carrier) frequency of 38.88 MHz, and analog to digital conversion takes place at a rate of 51.84 MHz, with 6 bits of resolution.

The passband samples, contained in received signal r 405, arrive at a downconverter 407. Because the bursts contain information which has been modulated on orthogonal carriers at the same or nearly the same frequency, the signal r contains information in both I and Q channels. When used herein, the term complex refers to both the I and Q channels.

The downconversion process converts the passband signal to filtered complex baseband signal which contains two samples per symbol. In a preferred embodiment, a method of digital downconversion is used in which a baseband signal is generated by a downconversion process in which the first step is the previously mentioned sampling of the RF passband signal at a rate which is equal to three-quarters of twice the upstream carrier frequency, a technique which is referred to herein as $f_s/4$ downconversion. Subsequent to this sampling, a baseband signal is generated by multiplication of the sampled bandpass signal by $e^{-nj}$$_{\pi/2}$, where n represents a discrete time variable. The complex baseband signal is separated into a real and imaginary part to create the I and Q channels. The resulting baseband signals, one for the I channel and one for the Q channel, are interpolated by two to produce three output samples for every input sample. Low pass filtering is performed on the interpolated signals, and the resulting filtered baseband signals are decimated by eight to produce one output sample for every eight input samples.

The system synchronization and downconversion processes may not be exact and the resulting baseband signal may be offset in frequency. In a preferred embodiment of the present invention, frequency offsets of ±300 parts per million (ppm) are tolerated in both the clock and carrier frequencies.

After downconversion a complex signal x is formed comprised of $x_I$ 408 and $x_Q$ 409. A pulse detection circuit 410 is used to determine the presence of a burst, and signal this presence to an I channel decision circuit 470 and a Q channel decision circuit 471.

Phase rotation on the complex signal X is performed by the use of a quadrant selector 412. The phase rotation in the quadrant selector 412 is performed by examining the sign of the components of the complex signal which represents the peak of the pulse in the preamble, and rotating the signal by the appropriate amount, as given by the table in FIG. 10. The resulting rotated complex signal x' is comprised of $x'_I$ 414 and $x'_Q$ 415.

A fractionally spaced cross-coupled equalizer structure 440 is used to filter the complex signal x' The signal x' arrives at Finite Impulse Response (FIR) filters FIR__A and FIR__B. As shown in FIG. 4, the distinction between filters FIR__A and filters FIR__B are that filters FIR__A 450 and FIR__A 453 are through filters and filters FIR__B 451 and FIR__B 452 are cross path filters. In the I channel the signal $x'_I$ 414 is processed by a first filter FIR__A 450 which is receives I channel adaptation signal $\omega_I$ 472, and a second filter FIR__B 451 which receives Q channel adaptation signal $\omega_Q$ 473. In the Q channel the signal $x'_Q$ 415 is processed by a third filter FIR__B 452 which receives I channel adaptation signal $\omega_I$ 472, and a fourth filter FIR__A 453 which receives Q channel adaptation signal $\omega_Q$ 473.

The output signals from the first through fourth FIR filters are $g_I$ 454, $g_{Q'}$ 457, $g_{I'}$ 456, and $g_Q$ 455 respectively. The signals $g_I$ 454 and $g_{I'}$ 456 are summed in a first summer 458, and the signals $g_Q$ 455 and $g_{Q'}$ 457 are summed in a second summer 459.

The outputs of first summer 458 and second summer 459 are received by first decimator 460 and second decimator 461 respectively, which form a single sample per symbol. The resulting signal is referred to herein as a second complex baseband signal, where the term complex again refers to both I and Q channels, which represent the signals $q_I$ 462 and $q_Q$ 463 respectively.

Each component of the second complex baseband signal formed by $q_I$ 462 and $q_Q$ 463 passes through a decision circuit; signal $q_I$ 462 passing through a first decision circuit 470, and signal $q_Q$ 463 passing through a second decision circuit 471. The decision circuit performs several functions, one of which is to determine if the signal is above or below one or more thresholds, and based on that determination produce an estimate of the received symbol. For the case of QPSK modulation, a single threshold is used, and if the signal received at the decision circuit is above the threshold it is estimated to be a '1' and if it is below the threshold it is estimated to be a '0'. For more complex modulation formats, such as 16 Quadrature Amplitude Modulation (16 QAM) two thresholds are necessary, and for the example of 16 QAM, one of four values is assigned as the estimated symbol value.

The output of the decision circuits forms a third complex baseband signal which contains the recovered symbols. As shown in FIG. 4, the output signal from the first decision circuit 470 is $y_I$ 490, and from the second decision circuit 471 is $y_Q$ 491. The recovered symbols are the result of the burst mode detection process and, if encoding for the purposes of error detection, error correction or encryption was performed on the data prior to transmission, suitable decoding can be perform to recover the transmitted data. Such encoding and decoding methods are known to those skilled in the art.

Another function of the decision circuits is the generation of an error signal. As illustrated in FIG. 4, decision circuit 470 produces error signal $\epsilon_I$ 474, and decision circuit 471 produces error signal error signal $\epsilon_Q$ 475. These error signals are used to generate channel adaptation signals $\omega_I$ 472 and $\omega_Q$ 473 which are used by the FIR filters to adjust the tap coefficients such that the error signal is minimized.

IV. Burst mode signal recovery

Figure 5:
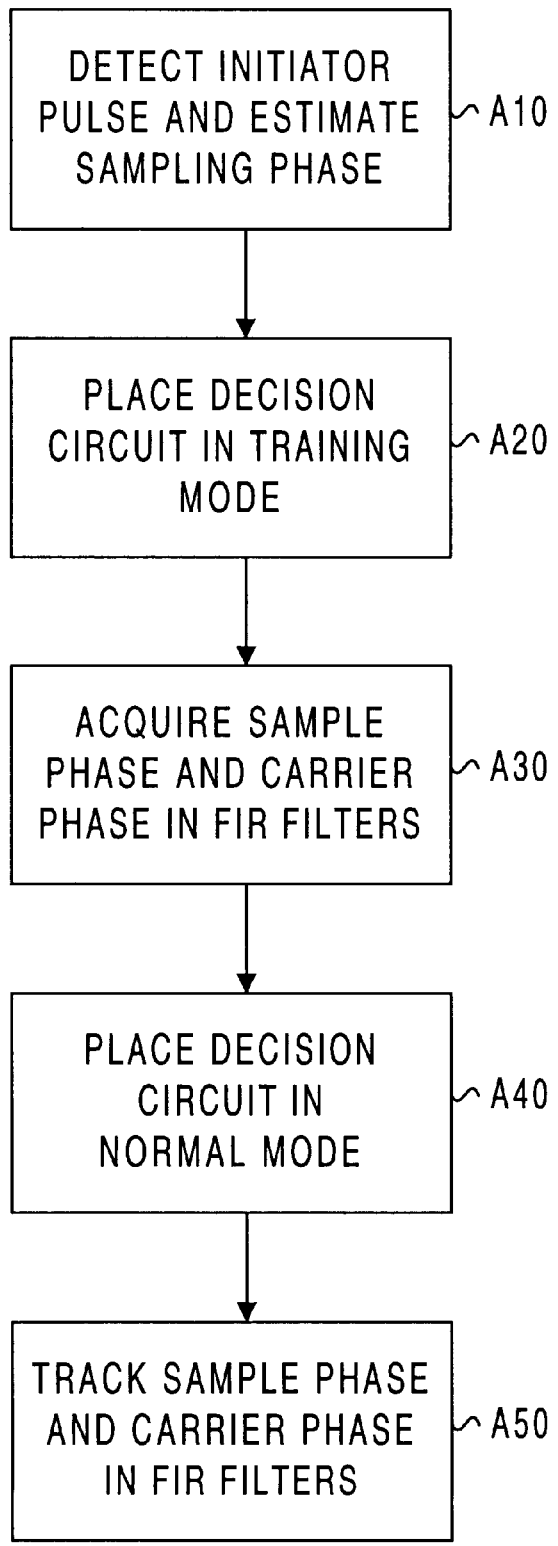
FIG. 5 illustrates the process in which sample and carrier phase is acquired and tracked.

The process by which burst mode signal recovery is accomplished in the present invention is illustrated in FIG. 5. The predetermined preamble which is transmitted from a burst mode transmitter 110 contains an initiator pulse, which is a symbol or a sequence of symbols which can be used by the receiver to determine the presence of a burst. In the first step A10 an initiator pulse is detected, and an estimate of the sampling phase made by determining which of the samples which comprise the initiator pulse is the sample closest to the center of the initiator pulse.

The second step A20 is the placement of the decision circuit in training mode, during which time the decision circuit compares the recovered symbols to those of a stored version of the predetermined preamble, and generates an initial error signal which indicates how well the two signals compare.

The third step A30 is the acquisition of the correct sample phase and elimination of the carrier offset in the FIR filters.

This is accomplished by using the initial error signal and adjusting the tap coefficients in the filter such that the initial error signal is minimized. In doing so the sample phase is adjusted such that one sample is at the optimum sampling point with a maximum of signal and a minimum of noise. Similarly, the adjustment of the tap coefficients in the filters results in an elimination of the carrier phase offset and a minimization of crosstalk between the I and Q channels.

Once the predetermined preamble has been used to establish the correct values for the tap coefficients in the FIR filters, a fourth step A40 occurs in which the decision circuit is placed in normal operation mode and the normal operation mode error signal which is generated is a result of a comparison between the recovered symbols and the signal entering the decision circuit.

A fifth step A50 is the tracking of the sample phase and carrier phase during normal operation to insure that if there is drift in either of these phases, the appropriate adjustments to the filter tap coefficients occur. This is accomplished by minimization of the normal operation mode error signal which is generated by the decision circuit.

Figure 6A:
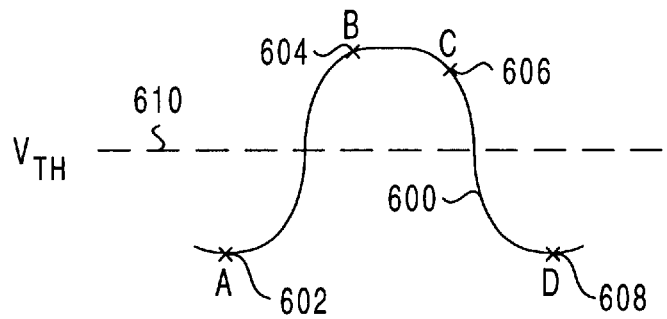
FIG. 6 illustrates the detection of the presence of a predetermined symbol.
Figure 6B:
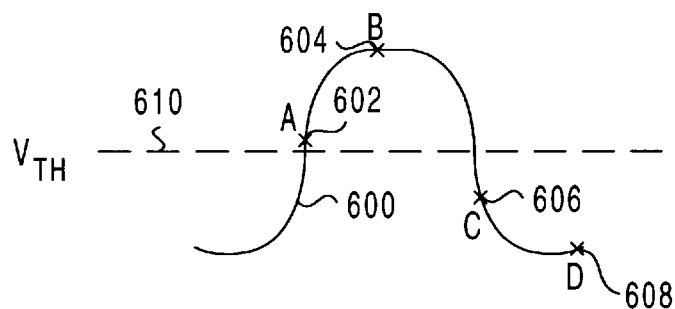
Figure 6C:
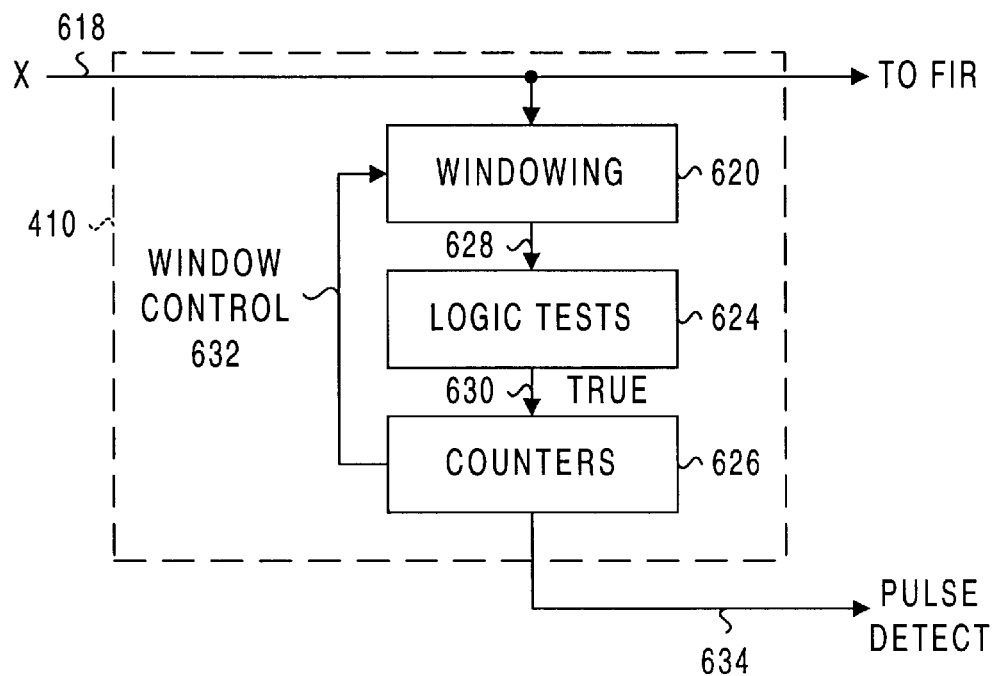

The pulse detection circuit 410 illustrated in FIG. 4 and used to accomplish the first step A10 is shown in more detail in FIG. 6c. FIGS. 6a and 6b illustrate the arrival of a baseband signal x 618 which, as will be discussed, represents the power in the first complex baseband signal.

The method by which the presence of the pulse is detected is illustrated in FIG. 6a and FIG. 6b where variables a 602, b 604, c 606, and d 608 are shown. The values of variables a 602, b 604, c 606, and d 608 are determined as the squared values of four contiguous signal samples of the first complex baseband signal x, with $a=a_I^2+a_Q^2$, $b=b_I^2+b_Q^2$, $c=c_I^2+c_Q^2$, and $d=d_I^2+d_Q^2$, thus a, b, c, and d represent the signal power of four contiguous samples of the received burst signal. FIG. 6(a) illustrates the values of variables a 602, b 604, c 606, and d 608 when the signal is in a first position, and FIG. 6(b) illustrates the values of variables a 602, b 604, c 606, and d 608 when the signal is in a second position. A threshold $V_{TH}$ 610 is used in conjunction with the variables a 602, b 604, c 606, and d 608 to determine the presence of a pulse and to determine if the second sample, corresponding to the variable b 604, is the sample closest to the center of the pulse.

The pulse detection circuit 410 operates by performing a windowing operation 620 on the complex signal x to select contiguous samples from the incoming data. In a first embodiment the selected samples 628 are passed to a series of logical tests 624 which are i) $b>V_{TH}$ ii) $(a<b)\bullet(c<b)$ where the symbol '•' represents a logical 'and' operation. In this embodiment for a burst is declared present when both test i) and ii) are true. Finding both test i) and ii) true results in generation of a positive value on the logical test result signal 630. In this embodiment only three samples and a single threshold are required to determine the presence of a burst.

In a preferred embodiment a series of logical tests 624 are used which are i) $b>V_{TH}$ ii) $(a<b)\bullet(c<b)$ iii) $(c>V_{TH})\bullet(d<b)\bullet(a<c)\bullet((b-d)>(i\ V_{TH}/2))$ The received sequence of values is determined to be a burst if tests i) and test ii) are true, or if tests i) and test iii) are true. In a preferred embodiment the variables a 602, b 604, c 606, and d 608 are calculated as the sum of the squares of the samples of first complex baseband signal x subsequently divided by 16, and a threshold of $V_{TH}=3$ is used. A 6 bit lookup table is used to implement the logical tests 624 based on a 6 bit samples 628.

The logical test result 630 indicates if a pulse is present, and if the second (b) sample is the nearest to the center of the symbol. A 'true' value from this test initiates counters 626 which generate signals including a pulse detect signal 634 and a window control signal 632. The rising edge of the pulse detect signal 634 place the first decision circuit 470 and second decision circuit 471 in training mode and to initialize FIR filters 450, 451, 452, 453.

There is a delay necessary to account for the propagation delay which occurs between detection of the pulse and the arrival of the pulse in the decision circuit. This delay can be incorporated in the counters 626 or in the first decision circuit 470 and second decision circuit 471. The exact delay is determined when the circuitry is simulated, usually in the process of the development of an Application Specific Integrated Circuit (ASIC). Methods for determination of the delay and implementation of circuitry to synchronize the operation of the decision circuit with the arrival of the pulse in the decision circuit, are known by those skilled in the state of the art.

For phase rotation the quadrant detector rotates all of the received data so that it ends up in the top right quadrant of the I-Q plane. Table II shown in FIG. 10 gives the degree of rotation required according to the values of $b_I$ and $b_Q$ which correspond to the 'b' sample in the I and Q channels respectively. The quadrant detector effectively initializes the carrier phase offset in increments of 90° to place the data in a known quadrant so that equalization in the FIR filters can take place more rapidly.

In a preferred embodiment the method of I/Q rotation based on the received $b_I$ and $b_Q$ samples shown in Table II of FIG. 11 is used. In this embodiment I or Q values as determined by the $b_I$ and $b_Q$ samples are determined to be positive, negative or zero and the transformation given in Table III of FIG. 11 is applied to place all samples in the top right quadrant of the I-Q plane.

Figure 7:
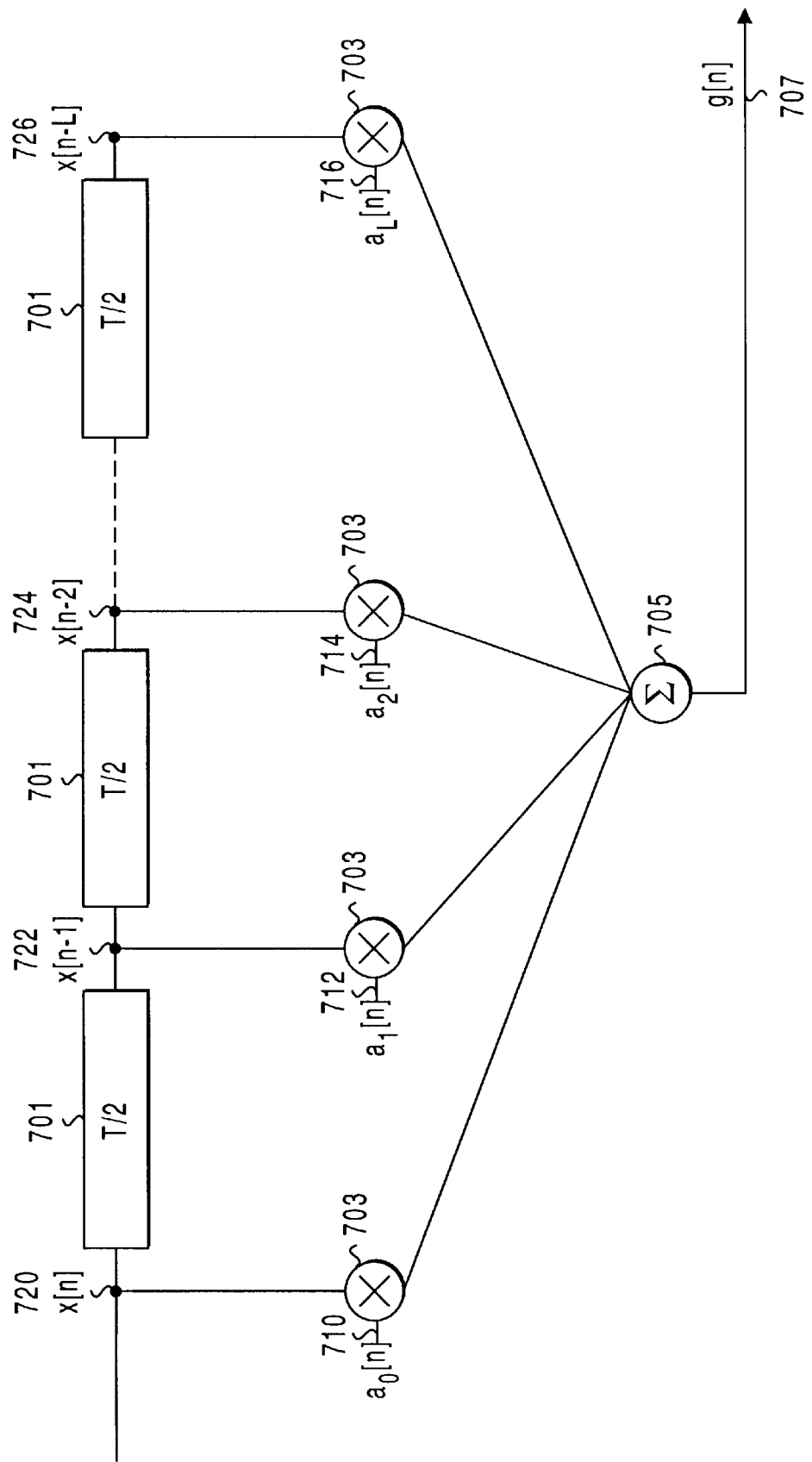
FIG. 7 illustrates a T/2 transversal filter structure.

The FIR filters (450, 451, 452 and 453) shown in FIG. 4 are further illustrated in FIG. 7 and are seen to be comprised of a series of T/2 delays 701, where T is the symbol period. Passing the first baseband complex signal x through the series of delays produces samples x[n] 720, x[n−1] 722, x[n−2] 724, . . . x[n−L] 726 at the taps which correspond to the sample values, and where n is a discrete time variable. These values are multiplied in multiplier 703 by a first set of time dependent coefficients $a_0[n]$ 710, $a_1[n]$ 712, $a_2[n]$ 714, . . . $a_L[n]$ 716 respectively. The resulting outputs are summed in summer 705 to produce the output signal g[n] 707 which is described by $$g[n] = \sum_{h=0}^{L} a_n[n]x[n-h].$$

In a preferred embodiment, FIR filters having 5 taps are used, which with 6 bits of resolution in the analog to digital conversion, provide carrier and clock recovery using a preamble consisting of 24 symbols including a dead time separating an initial pulse from a Barker sequence.

Figure 8:
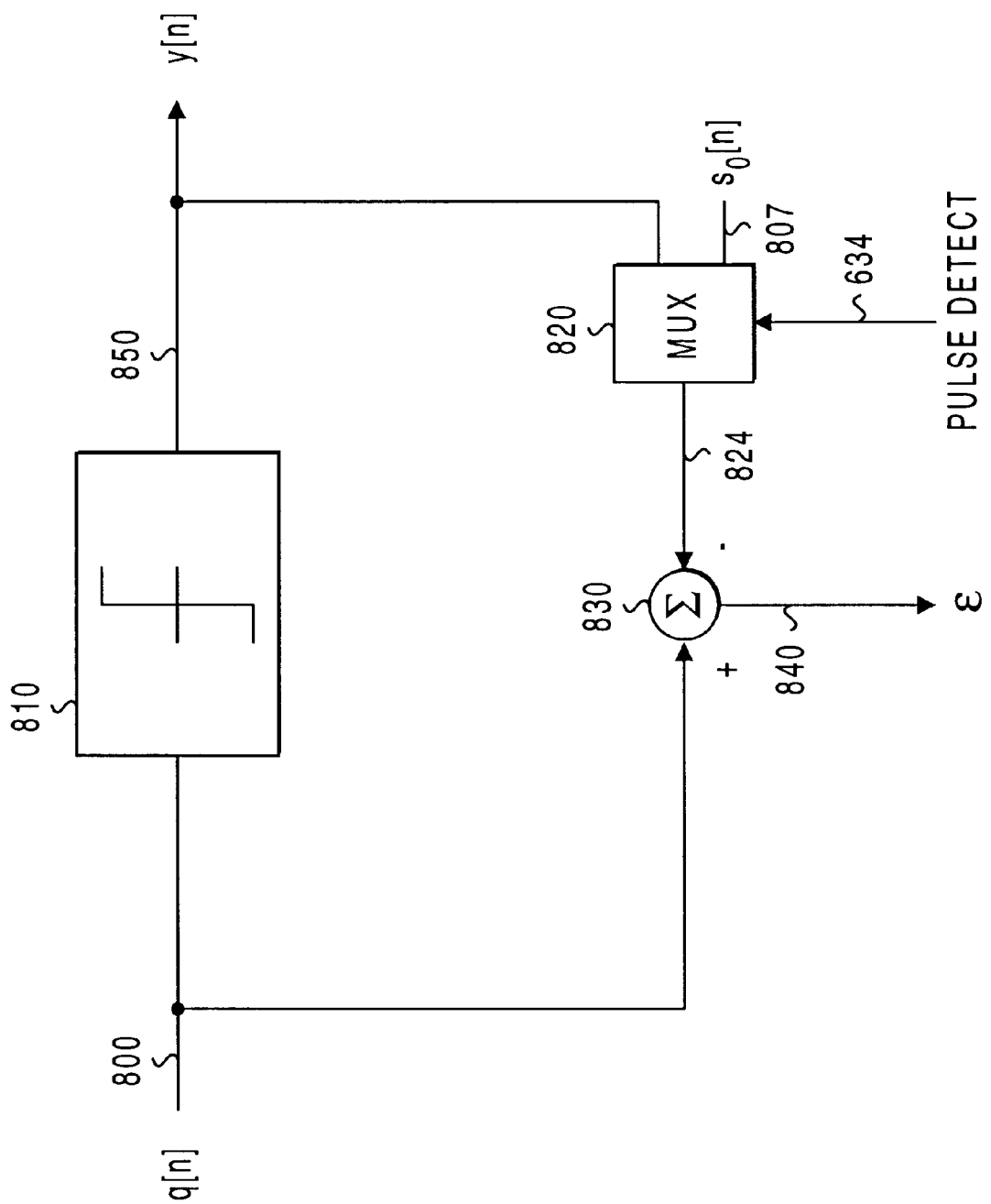
FIG. 8 illustrates a decision circuit including thresholding, correlation, and generation of an error signal.

The decision circuit is illustrated in FIG. 8 and consists of a thresholding circuit 810 which compares the incoming samples q[n] 800 with one or more threshold values to determine the values of the recovered symbols y[n] 850. For the case of Quadrature Phase Shift Keying (QPSK) modulation, a single threshold is sufficient, and the values of the data are determined to be equal to one or zero. It should be noted that the incoming samples q[n] 800 form the second complex baseband signal q, where the term complex again refers to both I and Q channels, which in this case are the signals $q_I$ 462 and $q_Q$ 463 respectively. The third complex baseband signal y is composed of the recovered symbols y[n] 850, where the term complex refers to both I and Q channels, which in this case are the signals $y_I$ 490 and $y_Q$ 491 respectively.

The decision circuit shown in FIG. 8 also generates an error signal $\epsilon$ 840. Consistent with the notation used herein, the error signal $\epsilon$ 840 which is a complex signal comprised of the error signals $\epsilon_I$ 473, and error signal $\epsilon_Q$ 472. During reception of the preamble an initial error signal is generated which is calculated as $\epsilon_{initial}[n]=q[n]-s[n]$ where s[n] is the predetermined sequence. During the normal mode of operation error signal is given by $\epsilon_{normal}[n]=q[n]-y[n]$.

As shown in FIG. 6 the pulse detect signal 634 is used to switch a multiplexor 820 and cause the predetermined sequence s[n] to appear on the multiplexor output 824 during training mode, wherein the error signal $\epsilon$ 840 is the initial error signal $\epsilon_{initial}$, and is calculated as the difference between the multiplexor output 824 and the incoming samples q[n] 800. This is accomplished by the use of a summer with an inverted input 830, where the inverted input is connected to the multiplexor output 824 and the output of the summer with an inverted input 830 is the error signal $\epsilon$ 840.

The predetermined sequence is also complex, having an I channel sequence and a Q channel sequence which do not necessarily need to be the same.

In a preferred embodiment, the burst mode receiver 120 is deployed in the BIU 250 of an ONU 240 which forms part of a FTTC network. A shared media 100 is created by a subscriber coaxial cable network comprised of a coaxial drop cable 270, splitter 280, and in-home coaxial wiring 272.

Burst mode transmitters 110 are deployed in the devices in the residence 290 as part of the Premise Interface Device (PID) 296, a computer containing a Network Interface Card (292) and settop 298. The devices in the residence receive forward signals from the BIU 250 which are modulated onto a FTTC forward carrier 310 at a frequency of 19.44 MHz, with a data rate of 51.84 Mb/s using 16 Quadrature Amplitude Modulation (16 QAM). Transmissions in the return direction take place on a FTTC return carrier 320 at a frequency of 38.88 MHz, with a data rate of 19.44 Mb/s using Quadrature Phase Shift Keying (QPSK), resulting in a symbol rate of 9.72 Symbols/s. The burst mode receivers receive opportunities or cell grants which comprise part of a TDMA protocol for controlling the transmissions of the burst mode transmitters 110. The downstream modulation formats, data rates, and carrier frequencies are not pertinent to the present invention and are not described in further detail.

Synchronization in the preferred embodiment is maintained by having a master clock at the ONU 110, which is synchronous with a signal from the PSTN 210. Data which is transmitted on the FTTC forward carrier 310 is synchronous with this master clock, as is the FTTC forward carrier 310. Receivers in the devices in the residence 290 recover the signal on the FTTC forward carrier 310 and phase lock a local oscillator to that signal. The burst mode transmitters 110 in the devices can then generate signals for transmission to the BIU 250 based on clocks which are harmonically related to the master clock in the ONU 240.

Because the clocks used at the burst mode transmitters 110 are harmonically related to the clocks in the ONU 240, the data rates and carrier frequencies of the bursts which are received at the BIU 250 are not completely unknown, but due to variations in the clock phase and frequency at the ONU 240 and the delays in the phase locking process in the devices at the residence 290 combined with the propagation delay from the residence to the ONU 240, the burst will arrive with an unknown symbol and carrier phase, and there may exist frequency offsets. The frequency offsets may be on the order of ±300 parts per million (ppm) for both the symbol frequency and the carrier frequency.

Because the preferred embodiment utilizes initial correlation of the received signal with a stored preamble to obtain convergence of the FIR filters, it is necessary to transmit a predetermined preamble from the burst mode transmitters 110. The preamble is also stored at the burst mode receiver in BIU 250.

A number of preambles can be used with the present invention. FIG. 9 illustrates the preamble sequence of an embodiment which is comprised of a binary '1' in both the I and Q channels, followed by a dead time of two symbols during which time no signal is transmitted, followed by a Barker sequence of 13 bits in the I channel, and the same Barker sequence reversed and inverted in the Q channel.

One skilled in the art will recognize that a Barker sequence may be modified without substantially altering its cross-correlation or autocorrelation properties. It is also recognized that a Barker sequence may comprise more than one Barker codeword, and in one embodiment a 13 bit Barker codeword is repeated twice to form the Barker sequence. In a preferred embodiment of the preamble, the initial pulse and dead time are followed by a 13 bit Barker codeword which is subsequently followed by a binary sequences which are different for the I channel and the Q channel. In a preferred embodiment the preamble is $I$=1 0 0 1 1 1 1 1 -1 -1 1 1 -1 1 -1 1 1 1 1 1 1 1 1 1

$Q$=1 0 0 -1 1 -1 1 1 -1 -1 1 1 -1 -1 -1 -1 -1 1 1 1 -1 1 -1 1 -1.

The number of ones in the pulse 420 can vary with a single occurrence of a one being the obvious minimum for being able to detect the presence of a pulse in a receiver. More than a single '1' can be transmitted but may cause unnecessary lengthening of the preamble. By transmitting a one in both the I and Q channels it is possible to use a power measurement at the receiver to detect the presence of the pulse. Since carrier recovery has not typically occurred when the pulse arrives, only a power measurement is possible, and the use of a one in both the I and Q channel allows a noncoherent power measurement to be used to detect the pulse.

The dead time 430 is provided to prevent precursors which may be formed in the filtering of the Barker sequence 440 in a burst mode receiver 120 from interfering with the reception and detection of the pulse 420, and visa versa.

Data is subsequently transmitted in the form of binary symbols modulated onto the orthogonal carriers using QPSK modulation.

In a preferred embodiment, the transmitter filters the signal prior to transmission, with a root raised cosine filter having a roll off factor of $\alpha$=0.35 (corresponding to an excess bandwidth of 35%) being a suitable choice for filtering. At the burst mode receiver, bandpass filtering is used to eliminate unwanted signals. In a preferred embodiment, matched filtering is used, and the receiver uses a filter with a roll of factor of $\alpha$=0.35.

Referring to FIG. 4, after to bandpass filtering in bandpass filter 402 at the burst mode receiver, analog to digital conversion takes place at a sampling rate of 51.84 MHz using a 6 bit A/D converter in analog to digital converter 404. A suitable choice for a component to provide the analog to digital conversion is the Analog Devices AD9066AR. This component is in fact a dual A/D converter which allows two burst mode receivers to utilize the same A/D.

Subsequent to the bandpass filtering and analog to digital conversion downconversion is performed on received signal r 405 by multiplying the complex digital signal by $e^{-\pi j n/2}$. An means of performing this downconversion is to multiply groups of four samples by the sequence 1,0,-1,0 in downconverter 407 to produce the I channel signal $x_I$ 408 and by 0,1,0,-1 in the downconverter 407 to produce the Q channel signal $x_Q$. Each channel is then digitally filtered using a low pass root raised cosine filter with $\alpha=0.35$ to provide matched filtering, the digital filtering process being represented in FIG. 4 as part of downconverter 407.

In a preferred embodiment the burst signal has a data rate of 19.44 Mb/s on a carrier of 38.80 MHz and is sampled at 51.84 MHz. The 51.84 MHz signals in the I and Q channels are interpolated by three to produce a data stream at 155.52 Mb/s which is filtered using digital filters which have root-raised cosine characteristics with $\alpha=0.35$. This signal is decimated by eight to produce I and Q channel signals at 19.44 Mb/s, each of which contain two samples per symbol.

The I and Q channels of the downconverted signals contain the transmitted burst symbols, but the phase of the sampling may be incorrect with respect to the ideal phase, in which one sample is taken at the center of the symbol, where the signal to noise ratio is at a maximum. Also, the downconversion has been performed with no knowledge of the carrier phase, so there may be considerable information from the I channel in the Q channel, and visa versa. One goal of the present system is to obtain the correct sampling phase and carrier phase such that the final sample represents the signal at the center of the symbol, with no crosstalk between the I and Q channels. Filtering of the received data can be performed to accomplish these goals without adjustment of the sampling clocks at the burst mode receiver.

A pulse detection circuit 410 is used on both $x_I$ 408 and $x_Q$ 409 to determine the presence of a burst using the logical test 624 shown in FIG. 6c. As previously described, this test is performed on the squared values of the samples. The test for the presence of the pulse thus depends on the received power, thus crosstalk between the I and Q channels due to incorrect carrier phase will not affect this test. The result of this test results in a logical test result 630 which is true when the variable b 604 corresponds to the sample which is closest to the center of the received symbol. The logical test 624 thus indicates not only that a burst is present, but that the 'b' sample is the closest to the center of the predetermined symbol. This is a first step in determining the correct sample phase.

In order to minimize the time required for the FIR filters to converge, an initialization of the FIR filters is used. In a preferred embodiment, the second tap weight $a_1[n]$ 712 is set to '1' in the through filters FIR_A 450 and FIR_A 453 while the other tap weights are set to zero. In the cross path filters FIR_B 451 and FIR_B 452 all of the tap weights $a_0[n]$ 710, $a_1[n]$ 712, $a_2[n]$ 714, . . . $a_L[n]$ 716 are initially set to zero.

The fractionally spaced cross coupled equalizer structure 440 is used to obtain the correct sampling phase and to eliminate crosstalk between the I and Q channels by producing an output signal g[n] 707 which is a weighted sum of the samples entering the filter. Once the FIR filters 450, 451, 452, and 453 have converged, the output signal g[n] 707 contains samples, one of which is appropriately at the center of the symbol, and in which the crosstalk has been eliminated or minimized, which is equivalent to an acquisition of carrier phase. In this way this embodiment of the invention allows for symbol phase recovery and carrier phase recovery without the adjustment of voltage controlled oscillators and the use of traditional phase locked loops. Digital filtering techniques are well understood by those skilled in the art.

In a preferred embodiment it is possible to determine the symbols even in the presence of frequency offsets or frequency drift in the received burst signal with respect to the clocks in the ONU 240. This is possible since the filtering process results in a tracking of symbol and carrier phase, and the phase is related to the frequency of the signals. The amount of frequency offset or drift the preferred embodiment will be able to track will depend on the burst length, since any inability of the system to track phase will result in an error which accumulates as the burst is received. When used with bursts 360 symbols and 37 $\mu$s long frequency offsets of ±300 ppm are tolerated. In addition, changes in frequency from burst-to-burst do not affect the ability to acquire the sample and carrier phases, since the system is memoryless, discarding the results of any previous adaptation of the filters when a new burst arrives.

Memory could be applied to produce an embodiment in which the characteristics, specifically the sample and carrier phases, of the bursts received from each transmitter are stored, with the advantage that the preamble could be reduced or even eliminated. The disadvantage of such an embodiment is that frequency offsets and drift would be tracked on a burst-to-burst basis, and for short and infrequent bursts the tolerance to changes in frequency would be less than the memoryless system in which the error accumulates without affecting the recovery of the data and is discarded subsequent to the reception of the burst.

The error signal $\epsilon$ 840 shown in FIG. 8 is used to generate a complex channel adaptation signal $\omega$ which is comprised of I channel adaptation signals $\omega_I$ 472 and Q channel adaptation signal $\omega_Q$ 473. The complex channel adaptation signal $\omega$ is utilized by the fractionally spaced cross coupled equalizer structure 440 to adjust the adjustable tap coefficients $a_0[n]$ 710, $a_1[n]$ 712, $a_2[n]$ 714, . . . $a_L[n]$ 716 with the adjustment being performed to minimize the error signal $\epsilon$ 840. In a preferred embodiment, a least mean squares algorithm is used to minimize error signal $\epsilon$ 840 and was used in preference to other adaptation methods because it has superior convergence properties, is more robust in the presence of noise, and can be readily implemented in an ASIC with a minimum number of gates since it does not require off-line gradient estimates or repetitions of data nor squaring, averaging, or differentiation of the data.

The LMS algorithm is based on the stochastic gradient technique for solving the minimization problem. Detailed descriptions of the LMS algorithm are presented in the article by B. Widrow et. al. entitled "Adaptive noise canceling: Principles and Applications," which was published in the *Proceedings of the IEEE* vol. 62, no. 12, pp. 1692–1716, December 1975, and is incorporated herein by reference.

The tap weights $a_0[n]$ 710, $a_1[n]$ 712, $a_2[n]$ 714, . . . $a_L[n]$ 716 at time instant n, are updated for time n+1, by adding to them a certain proportion governed by the step size u of the error signal $\epsilon$ 840. In a preferred embodiment the channel adaptation signal $\omega$ is given by $\omega_n = \omega_{n-1} + \mu \epsilon$ x' where x' is the rotated complex signal containing the data in the I channel which is x'$_I$ 414 and the data in the Q channel which is x'$_Q$ 415. In a preferred embodiment a step size $\mu$ is larger in training mode where the error signal is the initial error signal, than in the normal operation mode where the error signal represents the normal operation mode error signal. In a preferred embodiment a value of $\mu=\frac{1}{8}$ was used in training mode, and a value of $\mu=\frac{1}{64}$ was used during normal operation mode.

Alternate algorithms can be used for adaptive equalization based on the use of the error signal and are known to those skilled in the art. Examples of alternate algorithms can be found in the text entitled *Digital Communications*, by Edward A. Lee and David G. Messerschmitt, published by Kluwer Academic Publishers in 1994, which is incorporated herein by reference.

One of the advantages of the preferred embodiment is that the use of the digital filter structure allows for some variation in the received power of the signal. It is understood that separate power control mechanisms not pertinent to the present invention are used to maintain the power level of the bursts as seen by the burst mode receiver within a specified range, but that there may be some variation in the power levels of the bursts received from each burst mode transmitter 110. In the preferred embodiment, the use of a 6 bit D/A and 5 taps in the FIR filters results in a dynamic range of approximately 6 dB. Further dynamic range could be obtained by additional bits in the A/D process in combination with more taps in the FIR filters.

In a preferred embodiment the bandpass filter 402 can be realized as a combination of components including a bandpass filter which can be realized using TDK high Q inductors and standard capacitors to produce a seven resonator bandpass filter. For the analog to digital conversion an analog to digital converter such as the previously mentioned Analog Devices AD9066AR or the Plessy PCA913 can be used. The remaining functions of the burst mode receiver can be realized in an Application Specific Integrated Circuit (ASIC) with a few external components. In a preferred embodiment a Complementary Metal Oxide Semiconductor (CMOS) ASIC is used. Design of ASICs is known by those skilled in the art.

An application of the invention is the reception of data transmitted from a burst mode device located in a residence 290, an example of which is a settop 298 connected to a television 299, to a BIU 250 in an ONU 240 of a FTTC system. In this application a subscriber may be performing a channel change operation or other video related function through the remote control of a settop. This information is transmitted in the form of a burst from the settop 298 to the BIU 250, to the ONU 240, and to the HDT 230, which may effect the change or request another network element of the ATM network 220 to effect the change. The ability to receive the bursts from the settop 298 is essential to correctly interpret the subscriber commands.

Although the present invention has been described in considerable detail with reference to certain preferred versions thereof, other versions are possible. The present invention can be applied to burst reception using QPSK, 16 Quadrature Amplitude Modulation (16 QAM), 64 QAM, 256 QAM or a number of other modulation formats. The goal of the invention as a method and apparatus for the reception of burst mode data remains the same however. Therefore, the spirit and scope of the appended claims should not be limited to the description of the preferred versions contained herein.

What is claimed is:

1. A method for generating recovered symbols from a received signal at a receive end of a burst mode communications system, said burst mode communications system having bursts containing a predetermined preamble and data which are coded into symbols, modulated onto a carrier and transmitted from a transmit end, said method comprising:

(a) converting a received signal from a continuous time signal to a discrete time signal;

(b) downconverting said discrete time signal to produce a first complex baseband signal having at least two signal samples per symbol;

(c) detecting the presence of a burst in said first complex baseband signal;

(d) filtering said first complex baseband signal using at least one digital filter means having adjustable tap coefficients;

(e) decimating said first complex baseband signal to produce a second complex baseband signal having one signal sample per symbol;

(f) thresholding said second complex baseband signal to produce a third complex baseband signal containing recovered symbols;

(g) generating an error signal based upon a comparison of said recovered symbols to a set of symbols stored at said receiver end; and (h) adjusting said tap coefficients to minimize said error signal.

2. The method described in claim 1 wherein said error signal is an initial error signal.

3. The method described in claim 2 further comprising the steps of:

(a) generating a normal mode operation error signal based upon a comparison of said recovered symbols to said second complex baseband signal; and (b) adjusting tap coefficients of a digital signal filter means at said receiver end node to minimize said normal mode operation error signal.

4. The method described in claim 1 wherein adjustment of said adjustable tap coefficients to minimize said initial error signal is based on a least mean squares solution.

5. The method described in claim 3 wherein adjustment of said adjustable tap coefficients to minimize said normal mode operation error signal is based on a least mean squares solution.

6. The method described in claim 1 wherein said digital filter means is a fractionally spaced cross-coupled equalizer means.

7. The method described in claim 6 wherein said fractionally spaced cross-coupled equalizer means has 4 to 6 tap means.

8. The method described in claim 1 wherein said conversion of said received signal from a continuous time signal to a discrete time signal results in a discrete time signal with 6 bits of resolution.

9. A method for generating recovered symbols from a received signal at a receive end of a burst mode communications system, said burst mode communications system having bursts containing a predetermined preamble and data which are coded into binary symbols, modulated onto orthogonal carriers and transmitted from a transmit end, said method comprising:

(a) converting a received signal from a continuous time signal to a discrete time signal;

(b) downconverting said discrete time signal to produce a first complex baseband signal having at least two signal samples per symbol;

(c) detecting the presence of a burst in said first complex baseband signal;

(d) filtering said first complex baseband signal using at least one fractionally spaced cross-coupled equalizer having adjustable tap coefficients;

(e) decimating said first complex baseband signal to produce a second complex baseband signal having one signal sample per symbol;

(f) thresholding said second complex baseband signal to produce a third complex baseband signal containing recovered binary symbols;

(g) generating an initial error signal based upon a comparison of said recovered symbols to a set of binary symbols stored at said receiver end; and (h) adjusting said tap coefficients to minimize said initial error signal;

(a) generating a normal mode operation error signal based upon a comparison of said recovered binary symbols to said second complex baseband signal; and (b) adjusting tap coefficients of a digital signal filter means at said receiver end node to minimize said normal mode operation error signal.

10. The method described in claim 9 wherein adjustment of said adjustable tap coefficients to minimize said initial error signal is based on a least mean squares solution.

11. The method described in claim 9 wherein said fractionally spaced cross-coupled equalizer with adjustable tap coefficients has 4 to 6 tap means.

12. The method described in claim 9 wherein said conversion of said received signal from a continuous time signal to a discrete time signal results in a discrete time signal with 6 bits of resolution.

13. An apparatus for generating recovered symbols from a received signal at a receive end of a burst mode communications system, said burst mode communications system having bursts containing a predetermined preamble and data which are coded into symbols, modulated onto a carrier and transmitted from a transmit end, said apparatus comprising:

(a) means for converting a received signal from a continuous time signal to a discrete time signal;

(b) means for downconverting said discrete time signal to produce a first complex baseband signal having at least two signal samples per symbol;

(c) means for detecting the presence of a burst in said first complex baseband signal;

(d) means for filtering said first complex baseband signal using at least one digital filter means having adjustable tap coefficients;

(e) means for decimating said first complex baseband signal to produce a second complex baseband signal having one signal sample per symbol;

(f) means for thresholding said second complex baseband signal to produce a third complex baseband signal containing recovered symbols;

(g) means for generating an error signal based upon a comparison of said recovered symbols to a set of symbols stored at said receiver end; and (h) means for adjusting said tap coefficients to minimize said error signal.

14. The apparatus described in claim 13 wherein said error signal is an initial error signal.

15. The apparatus described in claim 14 further comprising the steps of:

(a) means for generating a normal mode operation error signal based upon a comparison of said recovered symbols to said second complex baseband signal; and (b) means for adjusting tap coefficients of a digital signal filter means at said receiver end node to minimize said normal mode operation error signal.

16. The apparatus described in claim 15 wherein adjustment of said adjustable tap coefficients to minimize said normal mode operation error signal is based on a least mean squares solution.

17. The apparatus described in claim 13 wherein adjustment of said adjustable tap coefficients to minimize said initial error signal is based on a least mean squares solution.

18. The apparatus described in claim 13 wherein said digital filter means is a fractionally spaced cross-coupled equalizer means.

19. The apparatus described in claim 18 wherein said fractionally spaced cross-coupled equalizer means has 4 to 6 tap means.

20. The apparatus described in claim 13 wherein said conversion of said received signal from a continuous time signal to a discrete time signal results in a discrete time signal with 6 bits of resolution.

21. An apparatus for generating recovered symbols from a received signal at a receive end of a burst mode communications system, said burst mode communications system having bursts containing a predetermined preamble and data which are coded into binary symbols, modulated onto orthogonal carriers and transmitted from a transmit end, said apparatus comprising:

(a) means for converting a received signal from a continuous time signal to a discrete time signal;

(b) means for downconverting said discrete time signal to produce a first complex baseband signal having at least two signal samples per symbol;

(c) means for detecting the presence of a burst in said first complex baseband signal;

(d) means for filtering said first complex baseband signal using at least one fractionally spaced cross-coupled equalizer having adjustable tap coefficients;

(e) means for decimating said first complex baseband signal to produce a second complex baseband signal having one signal sample per symbol;

(f) means for thresholding said second complex baseband signal to produce a third complex baseband signal containing recovered binary symbols;

(g) means for generating an initial error signal based upon a comparison of said recovered symbols to a set of binary symbols stored at said receiver end; and (h) means for adjusting said tap coefficients to minimize said initial error signal;

(a) means for generating a normal mode operation error signal based upon a comparison of said recovered binary symbols to said second complex baseband signal; and (b) means for adjusting tap coefficients of a digital signal filter means at said receiver end node to minimize said normal mode operation error signal.

22. The apparatus described in claim 21 wherein adjustment of said adjustable tap coefficients to minimize said initial error signal is based on a least mean squares solution.

23. The apparatus described in claim 21 wherein said fractionally spaced cross-coupled equalizer with adjustable tap coefficients has 4 to 6 tap means.

24. The apparatus described in claim 21 wherein said conversion of said received signal from a continuous time signal to a discrete time signal results in a discrete time signal with 6 bits of resolution.

* * * * *